Dec. 21, 1926.  
E. W. SKELTON  
1,611,491  
TRACTOR GUIDE  
Filed July 29, 1925  
2 Sheets-Sheet 1

Inventor  
E. W. Skelton  
By Lacey & Lacey, Attorneys

Dec. 21, 1926.  
E. W. SKELTON  
TRACTOR GUIDE  
Filed July 29 1925  
1,611,491  
2 Sheets-Sheet 2

Inventor  
E. W. Skelton.  
By Lacey & Lacey, Attorneys

Patented Dec. 21, 1926.

1,611,491

UNITED STATES PATENT OFFICE.

EARL W. SKELTON, OF WAUNETA, NEBRASKA.

TRACTOR GUIDE.

Application filed July 29, 1925. Serial No. 46,797.

The object of this invention is to provide an attachment for tractors by the use of which the tractor may be automatically caused to follow a furrow when cultivating cotton or other plants without requiring the close attention of the operator and imposing unnecessary work upon him. The invention seeks to provide an attachment for the stated purpose which may be easily applied to any known type of tractor without requiring substantial change therein and which may be readily connected to the ordinary steering mechanism of the tractor so that as the machine progresses over a field it will be automatically caused to follow the line of a furrow. Incidental objects of the invention will appear in the course of the following description, and the invention resides in certain novel features which will be particularly pointed out in the appended claims.

One embodiment of my invention is illustrated in the accompanying drawings, in which—

Figures 1, 2:
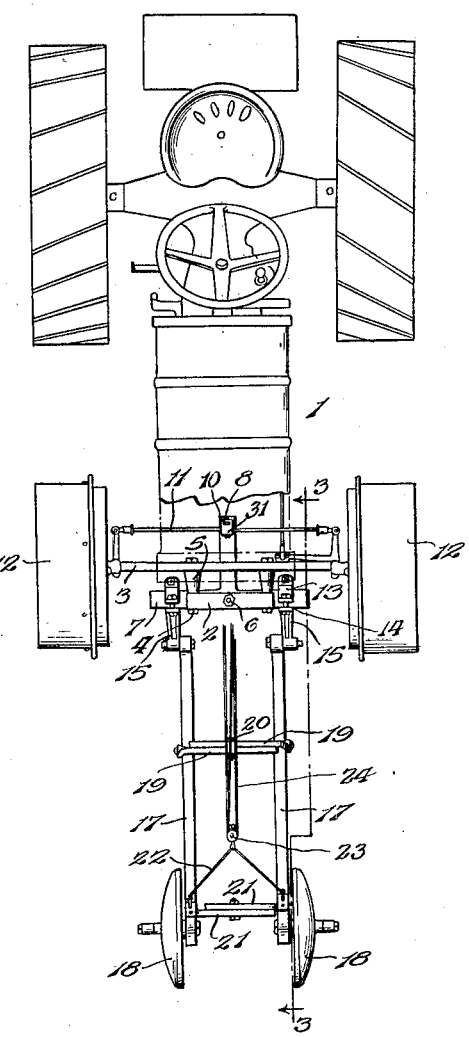
Figure 1 is a plan view of the attachment applied to a tractor.
Fig. 2 is a front elevation of the same.

The tractor, indicated at 1, may be of any well-known type.

The attachment of my invention includes a bar or block 2 which is secured to the front axle 3 of the tractor by bolts 4 inserted through the ends of the block and through the axle in an obvious manner, spacing sleeves 5 being fitted around the bolts between the block and the axle so as to maintain the proper relation between the block and the axle. Inserted vertically through the block 2 at the center thereof is a bolt 6 which constitutes a king bolt and upon the lower end of this bolt is pivotally supported a cross bar 7 which constitutes a steering head. Extending rearwardly from the cross bar or steering head 7 is a central arm 8 which preferably is integral with the steering head and is provided in its rear end portion with a longitudinal slot 9. Fitted slidably through the said slot is a bolt or pin 10 which is secured by a set screw 30 in a block or collar 31, said block or collar being in turn secured to the usual drag link or connecting rod 11 of the tractor steering mechanism whereby, if the steering head and the arm be rocked pivotally about the king bolt 6, the drag link will be shifted endwise transversely of the tractor and the steering wheels 12 thereof will be turned in the usual manner. Upon the end portions of the steering head or cross bar 7 are engaged clamping plates 13 which are opposed to forks 14 formed on the ends of downwardly and forwardly extending arms 15, securing bolts 16 being engaged through the terminal portions of the clamping plates and the forks to secure the same and the said arms 15 to the steering head. Pivoted to the ends of the arms 15 are the rear ends of steering bars 17 which project forwardly and carry at their front ends rollers 18 which are preferably in the form of bell drums or casters adapted to run in the furrow and bear against the sides of the same without digging into the soil so that deviation of the furrow from a rectilinear path will cause lateral movement of the wheels and thereby effect horizontal pivotal movement of the steering head 7 to cause the tractor to automatically follow the line of the furrow in an obvious manner. The arms 15 may be adjusted to any desired points of the cross bar or head 7 so that the device may be easily set to conform to the width of the furrow, and, to maintain the steering bars 17 in parallel relation, I secure to each of said bars between the ends thereof a bracket or bracing member 19 which rises therefrom and then extends inwardly to overlap the similar portion of the member secured to the other bar. The upper inwardly extending portion of each bracket or bracing member is provided with a plurality of openings and a fastening bolt 20 is inserted through the alined openings of the two members so as to secure them in a set relation and thereby maintain the bars 17 in parallelism and at the desired distance apart. Similar bars or bracing members 21 are secured to the steering bars adjacent the front extremities thereof.

The pivotal mounting of the steering bars 17 permits them to automatically conform to variations in the depth of the furrow in which they are running and it also facilitates the lifting of the arms into an inoperative position when the tractor is to be turned at the end of a row. To effect the lifting of the steering arms, a bail 22, which may be a rope, is attached to and extends between the front ends of the steering bars, and carried by this bail is a pulley 23 around which is trained a cable 24, one end of the cable extending rearwardly over the tractor and being equipped with a handle 25 of any preferred form whereby it may be conveniently grasped by the operator, and the opposite end of the cable being secured in any desired manner so as to be relatively fixed. An intermediate portion of the cable is preferably trained around a guide pulley 26 which may be conveniently supported over the radiator cap 27 of the tractor.

Figure 3:
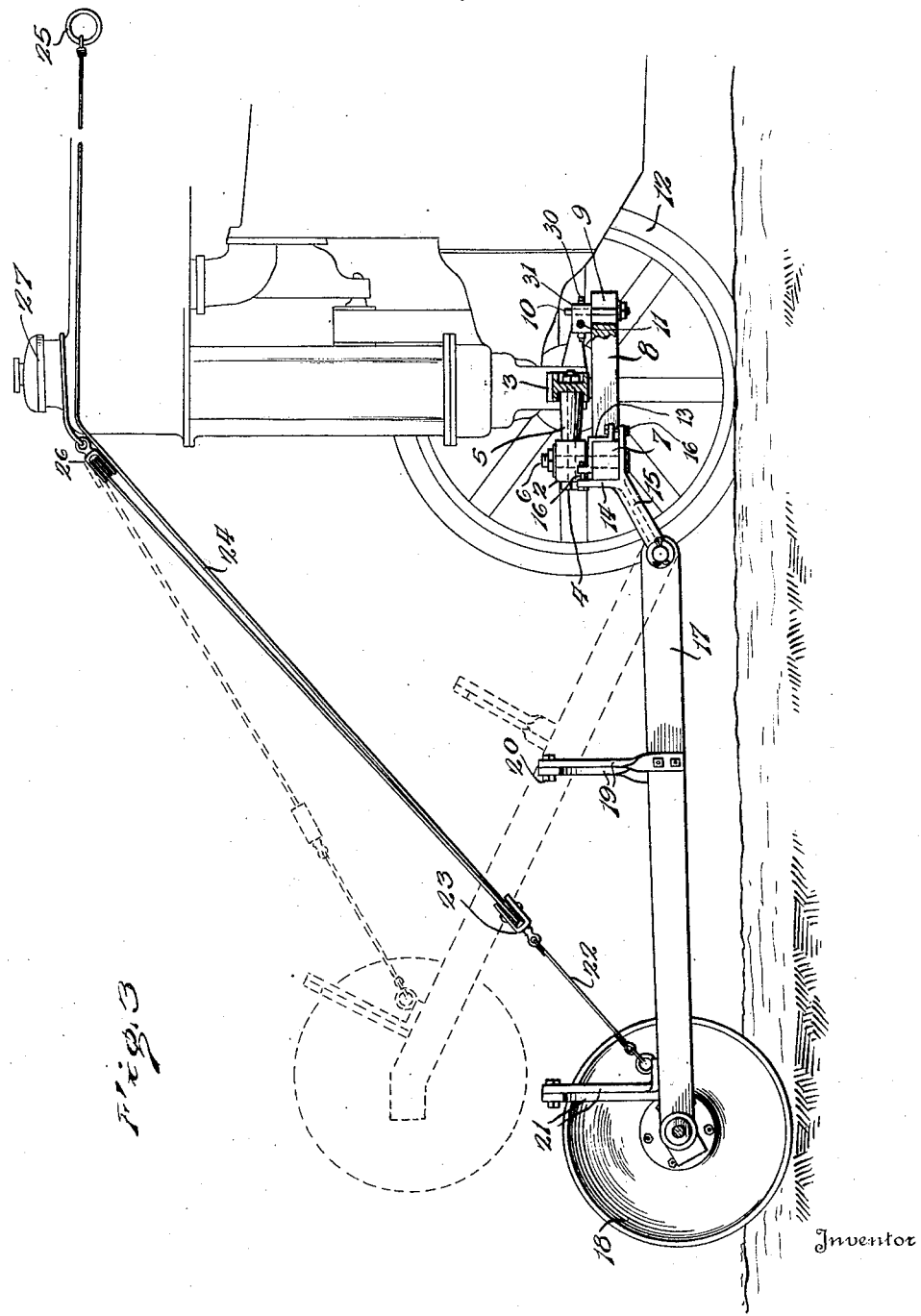
Fig. 3 is a side elevation with parts in section.

My improved steering attachment is designed more particularly for use in cultivating listed corn, and in operation the wheels 18 will run in the furrow, as shown in Fig. 2 of the drawings, the tractor wheels running upon the ridges between the furrows, as will be understood upon reference to Fig. 2. When thus arranged, the forward travel of the tractor will, of course, cause the steering attachment to travel in the furrow and any lateral deformations in the side walls of the furrow will act upon the wheels 18 to cause lateral shifting of the same, which shifting will be transmitted to the steering wheels of the tractor in an obvious manner. It will be readily noted that I have provided a very simple and inexpensive attachment which may be easily secured to any known tractor and easily adjusted to the width of the furrow. The operator of the tractor is relieved of the necessity of closely watching the progress of the machine inasmuch as it will be automatically held to the line of the furrow and when the end of a furrow has been reached a pull upon the cable 24 will lift the steering attachment, as indicated by dotted lines in Fig. 3, so that the tractor may then be turned through the usual manipulation of the tractor steering gear.

Having thus described the invention, I claim:

1. A steering attachment for tractors comprising a base block, means for securing said base block to the front axle of a tractor, a steering head pivotally supported by said base block, means for connecting the head with an operating member of the tractor steering mechanism, steering bars connected to and extending forwardly from the steering head, steering wheels carried by the front ends of said bars to ride in a furrow, and extensible bracing connections between said bars.

2. A steering attachment for tractors comprising a base block to be secured to the front axle of a tractor, a steering head pivotally supported by said base block, means for connecting said steering head with the steering mechanism of a tractor, arms rigidly secured to said steering head and adjustable toward and from the ends of the same, steering bars pivotally connected to said arms, and steering wheels carried by the front ends of said bars to run in a furrow.

3. A steering attachment for tractors comprising a base block to be secured to the front axle of a tractor, a steering head pivotally supported by said base bolck, means for connecting the steering head with the steering mechanism of a tractor, arms secured to said steering head and projecting forwardly therefrom, steering bars pivotally secured to said arms and extending forwardly therefrom, steering wheels carried by the front ends of said arms to run in a furrow, and a lifting device connected with said bars.

4. A steering attachment for tractors comprising a base block to be secured to the front axle of a tractor, a steering head pivotally mounted upon said base block, means for connecting said steering head with the steering mechanism of a tractor, arms rigidly secured to said steering head and adjustable toward and from the ends thereof, steering bars carried by said arms and projecting forwardly therefrom, steering wheels carried by the front ends of said bars to run in a furrow, and bracing elements secured to the bars and rising therefrom and having their upper ends extended inwardly and overlapping, and means for securing the overlapping inwardly projecting ends of said bracing members together.

In testimony whereof I affix my signature.

EARL W. SKELTON. [L. S.]